US011049294B2

(12) United States Patent
Yang et al.

(10) Patent No.: US 11,049,294 B2
(45) Date of Patent: Jun. 29, 2021

(54) ACTIVITY-DEPENDENT, SPATIALLY-VARYING REGULARIZATION PARAMETER DESIGN FOR REGULARIZED IMAGE RECONSTRUCTION

(71) Applicant: CANON MEDICAL SYSTEMS CORPORATION, Otawara (JP)

(72) Inventors: Li Yang, Schaumburg, IL (US);
Wenyuan Qi, Lake Bluff, IL (US);
Chung Chan, Glenview, IL (US);
Evren Asma, Buffalo Grove, IL (US)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 151 days.

(21) Appl. No.: 16/149,439

(22) Filed: Oct. 2, 2018

(65) Prior Publication Data

US 2020/0105032 A1 Apr. 2, 2020

(51) Int. Cl.
*G06K 9/00* (2006.01)
*G06T 11/00* (2006.01)
*G06T 5/00* (2006.01)

(52) U.S. Cl.
CPC ............ *G06T 11/006* (2013.01); *G06T 5/002* (2013.01); *G06T 2207/10104* (2013.01); *G06T 2207/20192* (2013.01)

(58) Field of Classification Search
CPC ............. G06T 2211/424; G06T 11/006; G06T 11/008; G06T 2211/421; G06T 5/50
See application file for complete search history.

(56) References Cited

U.S. PATENT DOCUMENTS

| 10,133,846 | B2 * | 11/2018 | Takata | ................ G06F 16/5838 |
| 2011/0118595 | A1 * | 5/2011 | Aulbach | ............... G06T 7/0012 600/425 |

(Continued)

OTHER PUBLICATIONS

J. Webster Stayman and Jeffrey A. Fessler, "Regularization for Uniform Spatial Resolution Properties in Penalized-Likelihood Image Reconstruction," IEEE Transactions on Medical Imaging, vol. 19, pp. 601-615, 2000.

(Continued)

*Primary Examiner* — Avinash Yentrapati
(74) *Attorney, Agent, or Firm* — Oblon, McClelland, Maier & Neustadt, L.L.P.

(57) ABSTRACT

A method and apparatus is provided to iteratively reconstruct an image from gamma-ray emission data by optimizing an objective function with a spatially-varying regularization term. The image is reconstructed using a regularization term that varies spatially based on an activity-level map to spatially vary the regularization term in the objective function. For example, more smoothing (or less edge-preserving) can be imposed where the activity is lower. The activity-level map can be used to calculate a spatially-varying smoothing parameter and/or spatially-varying edge-preserving parameter. The smoothing parameter can be a regularization parameter β that scales/weights the regularization term relative to a data fidelity term of the objective function, and the regularization parameter β can depend on a sensitivity parameter. The edge-preserving parameter β can control the shape of a potential function that is applied as a penalty in the regularization term of the objective function.

20 Claims, 9 Drawing Sheets

(56) References Cited

U.S. PATENT DOCUMENTS

| | | | | |
|---|---|---|---|---|
| 2012/0177274 | A1* | 7/2012 | Koehler | G06T 11/008 382/131 |
| 2012/0220840 | A1* | 8/2012 | Morita | A61B 1/0638 600/317 |
| 2014/0029819 | A1* | 1/2014 | Zeng | G06T 11/006 382/131 |
| 2014/0126793 | A1* | 5/2014 | Ahn | G06T 11/006 382/131 |
| 2014/0126794 | A1* | 5/2014 | Ahn | G06T 11/008 382/131 |
| 2014/0358123 | A1* | 12/2014 | Ueda | A61M 25/0053 604/510 |
| 2015/0087957 | A1* | 3/2015 | Liu | G06K 9/6214 600/408 |
| 2015/0117730 | A1* | 4/2015 | Takayama | G06K 9/46 382/128 |
| 2015/0265162 | A1* | 9/2015 | Lavi | A61B 5/02007 600/408 |
| 2016/0045180 | A1* | 2/2016 | Keim | A61B 6/032 600/408 |
| 2016/0148371 | A1* | 5/2016 | Itu | A61B 5/026 382/128 |
| 2016/0157802 | A1* | 6/2016 | Anderson | A61B 6/504 600/427 |
| 2016/0157807 | A1* | 6/2016 | Anderson | A61B 6/032 600/427 |
| 2016/0327622 | A1* | 11/2016 | Ahn | G01T 1/2985 |
| 2017/0053423 | A1* | 2/2017 | Ahn | A61B 6/037 |
| 2017/0076014 | A1* | 3/2017 | Bressloff | A61B 6/5211 |
| 2017/0281131 | A1* | 10/2017 | Sendai | A61B 8/4416 |
| 2017/0311917 | A1* | 11/2017 | Allmendinger | A61B 6/032 |
| 2019/0122399 | A1* | 4/2019 | Jain | G06T 3/4007 |
| 2020/0093543 | A1* | 3/2020 | Takahashi | G06T 19/003 |
| 2020/0126229 | A1* | 4/2020 | Lavi | G06T 11/006 |

OTHER PUBLICATIONS

Jinyi Qi and Richard M. Leahy, "Resolution and Noise Properties of MAP Reconstruction for Fully 3D PET," IEEE Transactions on Medical Imaging, vol. 19, pp. 493-506, 2000.

Jinyi Qi and Ronald H. Huesman, "Penalized Maximum-Likelihood Image Reconstruction for Lesion Detection," Physics in Medicine and Biology, vol. 51, pp. 4017-4029, 2006.

Evren Asma et al , "Accurate and Consistent Lesion Quantitation with Clinically Acceptable Penalized Likelihood Images," IEEE Nuclear Science Symposium and Medical Imaging Conference, 2012.

* cited by examiner

β-map

δ-map

ACTIVITY-DEPENDENT, SPATIALLY-VARYING REGULARIZATION PARAMETER DESIGN FOR REGULARIZED IMAGE RECONSTRUCTION

FIELD

This disclosure relates to tomographic image reconstruction in which of iterative reconstruction is performed using an objective function that includes a spatially-varying regularizer, and, more particularly, to positron emission tomography (PET) image reconstruction in which the spatial variation of the regularization term is expressed in one or more of variations of the type of the regularization term, the regularization parameter, and the edge-preserving parameter.

BACKGROUND

In PET imaging, a tracer agent is introduced into the patient to be imaged via injection, inhalation, or ingestion. After administration, the physical and bio-molecular properties of the agent cause it to concentrate at specific locations in the patient's body. The actual spatial distribution of the agent, the intensity of the region of accumulation of the agent, and the kinetics of the process from administration to its eventual elimination are all factors that may have clinical significance.

During this process, a tracer attached to the agent will emit positrons. When an emitted positron collides with an electron, an annihilation event occurs, wherein the positron and electron are combined. Most of the time, an annihilation event produces two gamma rays (at 511 keV) traveling at substantially 180 degrees apart.

To reconstruct the spatio-temporal distribution of the tracer via tomographic reconstruction principles, each detected event is characterized for its energy (i.e., amount of light generated), its location, and its timing. By detecting the two gamma rays, and drawing a line between their locations, i.e., the line-of-response (LOR), one can determine the likely location of the original disintegration. While this process will only identify a line of possible interaction, by accumulating a large number of those lines, tomographic reconstruction can be used to estimate the original distribution.

As discussed above the LOR for coincidence pairs and the timing information is used to reconstruct a tomographic image of the radioactivity, yielding clinical information. However, this clinical information can often be obscured by noise. Noise can be mitigated to a degree using an iterative reconstruction (IR) algorithm to perform statistical image reconstruction using regularization. A tradeoff, however, exists between reducing noise and introducing other adverse effects into the reconstructed image (e.g., a high degree of regularization can reduce resolution and cause features in the reconstructed image to blur).

The particular details regarding how the tomographic reconstruction is performed can impact the image quality of the PET image (e.g., the resolution and signal-to-noise ratio (SNR)). Often, the method for reconstructing PET images is affected by a trade-off between higher SNR on the one hand and finer resolution on the other hand. This tradeoff if often significant because practical limitations and low count statistics (e.g., due to limitations in injected doses and scan durations) can cause the PET image quality to suffer from high noise levels and relatively poor spatial resolution (e.g., 5 to 7 mm resolution). These effects can lead to misdiagnoses and incorrect treatment decisions.

Accordingly, methods to improve the quality of PET images are desired.

BRIEF DESCRIPTION OF THE DRAWINGS

A more complete understanding of this disclosure is provided by reference to the following detailed description when considered in connection with the accompanying drawings, wherein.

DETAILED DESCRIPTION

Figure 1A:
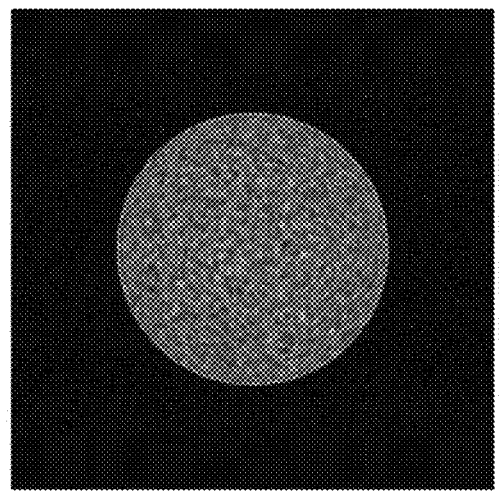
FIG. 1A shows a positron emission tomography (PET) image from a four-minute PET scan of a phantom, according to one implementation.

The details of the particular tomographic reconstruction method can impact the quality of the reconstructed PET image (e.g., the resolution and the signal-to-noise ratio (SNR)). For example, statistical iterative reconstruction (IR) algorithm can be used reconstruct a PET image of the tracer/activity density within a patient. The IR algorithm iteratively searches for the reconstructed image that optimizes an objective function, including a data fidelity term and a regularization term. The relative weight between these two terms can affect a trade-off between a higher SNR on the one hand and a finer resolution on the other hand. This tradeoff is often significant because practical limitations (e.g., limitations in injected doses and scan durations) result in low count statistics, degrading the image quality of the PET image due to high noise levels and relatively poor spatial resolution (e.g., 5 to 7 mm resolution). These effects can in turn lead to misdiagnoses and incorrect treatment decisions. Accordingly, methods to improve the quality of PET images are desired.

Accordingly, improved methods are desired to select the degree of regularization that produces optimal reconstructed images. Further, the degree of smoothing that is optimal in one part of the PET image might be sub-optimal in another part of the PET image. Thus, methods that can provide spatially-varying smoothing to locally optimize the quality of the PET image are also desired. These objectives are achieved by the methods described herein, which can use, in the objective function of an IR algorithm, one or more activity-dependent types of regularization and/or activity-dependent parameters in the regularization term.

For example, the methods described herein can improve the quality of PET images by spatially varying the regularization based on an activity-level mapping derived from a preliminary reconstructed image. That is, the parameters/type of the regularization can depend on a spatial variations in the activity level, which is derived from the reconstructed image itself, allowing, e.g., more smoothing in regions of low activity and less smoothing and/or more edge enhancement in regions of greater activity. In certain implementations, the regularization type, one or more regularization parameter (e.g., a parameter controlling the edge enhancement penalty/shape), and the regularization strength can each be based on an initially estimated activity map (e.g., a preliminary reconstructed PET image). In certain implementations, the methods described herein can iteratively refine the preliminary PET image by iteratively updating the preliminary PET image using the activity estimate from an earlier iteration to guide the smoothing strength used in current iteration. In certain implementations, the variations in the spatially-varying regularization can arise from a spatial dependence of the regularization parameter β that provides the relative weighting between the regularization term and the data fidelity term, as discussed below. In certain implementations, the variations in the spatially-varying regularization can arise from the penalty type and parameters used to define the penalty type, such as the edge-preservation parameter δ discussed below. In certain implementations, the penalty type and parameters can be changed from iteration to iteration based on the latest activity estimate.

Further, in certain implementations, the primary parameter for spatially varying the regularization is the smoothing strength (e.g., controlled by the regularization parameter β), which can be based on the estimated activity map. The relation between the activity map and the regularization parameter β (or other parameters) can be determined by any predetermined user-defined functions (e.g., $\beta(\vec{r}) = f(x(\vec{r}))$ in which $\vec{r}$ represent the position and $x(\vec{r})$ is the preliminary PET image as a function of position and $f(\cdot)$ is a predetermined user-defined function). This approach allows a user to scale regularization as any desired function of activity. The activity-dependent smoothing parameter scaling $\beta(\vec{r})$ can be used in combination with other smoothing parameter scaling rules such as attenuation-dependent scaling.

When the spatial dependence of the regularization is periodically updated to reflect the updated PET image being iteratively reconstructed using an IR algorithm, the methods described herein can apply a predefined number of iterations of the IR algorithm (e.g., 10-15 iterations) for each time the spatial dependence of the regularization is updated. Accordingly, in certain implementations, the methods described herein will alternate between performing a predefined number of iterations of the IR algorithm and updating the estimated activity map together with the spatial dependence of the regularization. Further, in certain implementations, the methods described herein, after the estimated activity map is sufficiently settled/constant (e.g., the settling condition/criteria can be based on the number of updates to the estimated activity map or based on an amount of change in the estimated activity map), the estimated activity map and the spatial dependence of the regularization will be fixed, allowing the IR algorithm to continue to completion (e.g., based on predefined stopping criteria) without further changes to the regularization).

The methods described herein are illustrated using an ordered subset (OS) expectation maximization (EM) algorithm as a non-limiting example of the IR algorithm for tomographic image reconstruction. However, as would be understood by a person of ordinary skill in the art, other IR algorithms can be used without departing from the spirit of the methods described herein. For example, many related methods are available for statistical iterative reconstruction for positron emission tomography (PET) images. Interest in iterative image reconstruction methods is partly driven by their ability to accurately model the system response and noise statistics in PET. Thus, they have been increasingly used to improve image quality. For example, the maximum likelihood (ML) method can be used to reconstruct an image from projections by maximizing the log likelihood of PET data. Related to the ML methods, penalized likelihood (PL) methods can also be used. In certain implementations, the image reconstruction problem is solved using the expectation maximization (EM) algorithm, which advantageously has a closed-form update, but also suffers from slow convergence.

Further, the methods herein can use regularized reconstruction (e.g., penalized maximum-likelihood image reconstruction), which can control the noise properties of smoothly reconstructed images. A good regularizer is able to suppress noise while preserving image features such as fine structures and sharp edges around organ boundaries. Properly tuning the penalty strength and penalty parameters to achieve optimal image quality can be a major challenge. Nevertheless, overcoming this challenge can benefit performance in the reconstructed images.

The optimal degree of regularization can depend the level of activity in a given image. That is, different images with different amounts of activity can benefit from having different degrees of regularization. Further, this idea can carryover and apply to different regions within an image. That is, a region with a greater level of activity can benefit from a different degree of regularization than a region with a lesser level of activity.

Figure 1B:
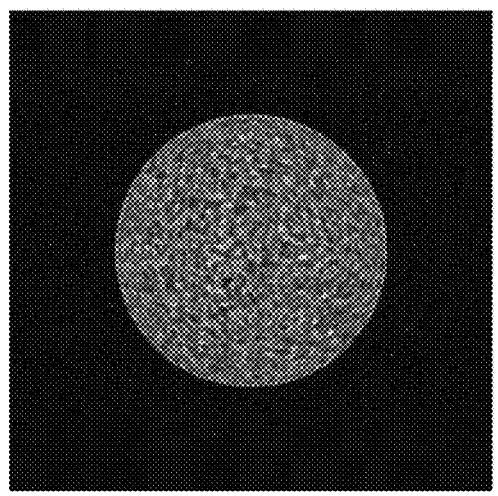
FIG. 1B shows a PET image from a two-minute PET scan of the phantom, according to one implementation.
Figure 1C:
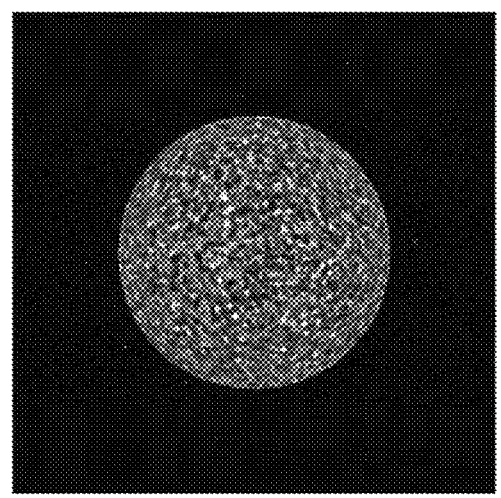
FIG. 1C shows a PET image from a one-minute PET scan of the phantom, according to one implementation.

Referring now to the drawings, wherein like reference numerals designate identical or corresponding parts throughout the several views, FIGS. 1A, 1B, and 1C illustrate this idea by showing reconstructed images generated using the same phantom and the same penalty strength and parameters for the regularization term in the objective function but with exposure times of 4, 2, and 1 minutes, respectively. However, the noise statics among FIGS. 1A, 1B, and 1C could be equalized through choosing a different penalty strength and/or penalty parameters depending on the total amount of activity recorded over the PET image acquisition time.

In general, since noise in acquired PET scan data often varies from case to case (e.g., due to different acquisition settings and different patient sizes), a regularization parameter that is suitable for one dataset might not be applicable to others. In addition, even inside the same patient, the desired regularization strength may vary from organ to organ due to different activity levels and the nonlinearity of the iterative reconstruction. As illustrated in FIGS. 1A, 1B, and 1C, when the same regularization penalty function with the same penalty strength and parameters is applied to datasets with different amounts of acquired activity (e.g., due to different scan times), then noise level in the reconstructed image increases inversely with the acquired activity (e.g., scan time), suggesting that a large smoothing parameter (i.e., penalty strength) can be used for low-count datasets to suppress the greater noise level in the reconstructed image.

Choosing regularization parameters that stabilize resulting image properties can be advantageous. Since different organs have different background activity levels, the regularization parameter can be position dependent (e.g., organ-activity dependent) in addition to being PET scan dependent (e.g., image and/or acquisition time dependent).

The regularization parameters, which can be adjusted to affect the degree and/or type of regularization, can be better appreciated by considering the cost function (also referred to as an objective function) to be optimized when solving the reconstruction problem. In PET, the emission data can be configured as a sinogram (similar to projection data in X-ray CT), and, therefore, methods similar to those applied in X-ray CT to reconstruct attenuation images can be applied to reconstruct activity images representing the activity/tracer density as a function of position/voxel index. These reconstruction methods include, e.g., filtered back-projection (FBP) methods and IR methods. Alternatively, the PET emission data can be maintained as a list of individual detection events, rather than being arranged into a sinogram, and the image can be reconstructed using a list-mode based reconstruction method.

In certain implementations using IR reconstruction, the reconstructed image $\hat{x}$ is generated by solving the optimization problem $$\hat{x}(y) = \arg\max_{x \geq 0} [L(y \mid x) - \beta \phi(x)],$$

wherein y is the measured sinogram, x is the unknown radioactive tracer/activity distribution, L(y|x) is the log likelihood function, $\phi(x)$ is the regularizer (also referred to as a regularization function or penalty function), and $\beta$ is the regularization parameter that controls the degree of regularization (also referred to as a penalty strength). In the above objective function, L(y|x) is the data-fidelity term and $\phi(x)$ is the regularization term (also known as regularizer). The regularization parameter $\beta$ provides the relative weight between the data-fidelity regularization and terms. For example, when the regularization term penalizes variations/noise in the reconstructed PET image, increasing the value of the regularization parameter $\beta$ increases the degree of smoothing, reducing both the noise level and the resolution.

In certain implementations, the regularizer can be a patch-based edge-preserving penalty function, which uses neighboring patches instead of individual pixels to compute the penalty as exemplified by the expression $$\phi(x) = \sum_{j=1}^{N} \sum_{l \in N_j} \gamma_{jl} \psi(|f_j(x) - f_l(x)|),$$

wherein the $\ell$-2 norm or Euclidean distance, which is given by $$(|f_j(x) - f_l(x)|) = \sqrt{\sum_{k=1}^{n_k} (x_{jk} - x_{lk})^{\wedge} 2}$$

can be used the measure of distance between the patches of pixels surrounding pixel j and pixel l, $N_j = \{x_{j1}, x_{j2}, \ldots, x_{1jk}\}$ denotes the neighborhood of pixel j, $\gamma_{jl}$ is the weight related to the distance between pixel j and pixel l, and $\psi(\bullet)$ is the potential function. The regularizer discussed above is straightforward to generalize and can be applied for both pairwise and patch-based penalties, as would be understood by a person of ordinary skill in the art. Other regularizers can be used without departing from the spirit of the methods described herein, as would be understood by a person of ordinary skill in the art.

By increasing the magnitude of the regularization parameter $\beta$ noise in the reconstructed image is suppressed while reducing resolution. Accordingly, regions having lower activity can benefit from a higher degree of smoothing because the count statistics in these regions make them more prone to low SNR (i.e., relatively high noise levels) and fine resolution in these regions is likely not required. For example, higher tracer densities and activity levels are generally found near the region of interest (e.g., due to higher metabolic rates of a lesion). Thus, image reconstruction in which lower activity corresponds to a larger regularization parameter $\beta$ can be beneficial.

Additionally, where the activity is high a lower regularization parameter $\beta$ can prevent reduced resolution without sacrificing image quality because the signal is already large compared to the noise. Thus, in these regions of high activity, the SNR can be already sufficiently high without the increased smoothing provided by a large value for the regularization parameter $\beta$. Therefore, in certain implementations, the methods described herein use a spatially varying map for the regularization parameter $\beta(\vec{r})$.

Figure 3A:
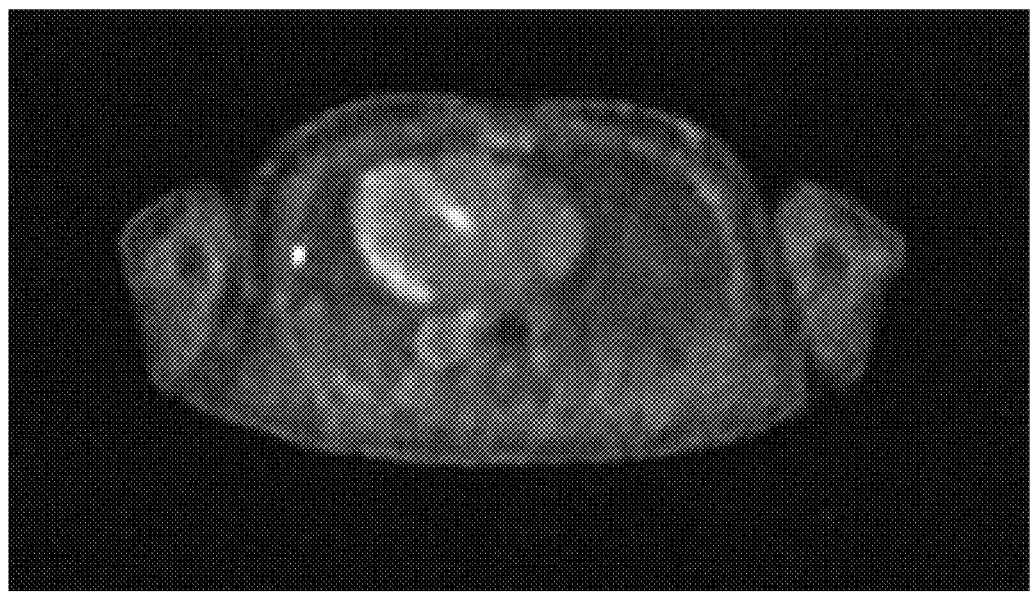
FIG. 3A shows a PET image using spatially-constant regularization with a small smoothing strength, according to one implementation.
Figure 3B:
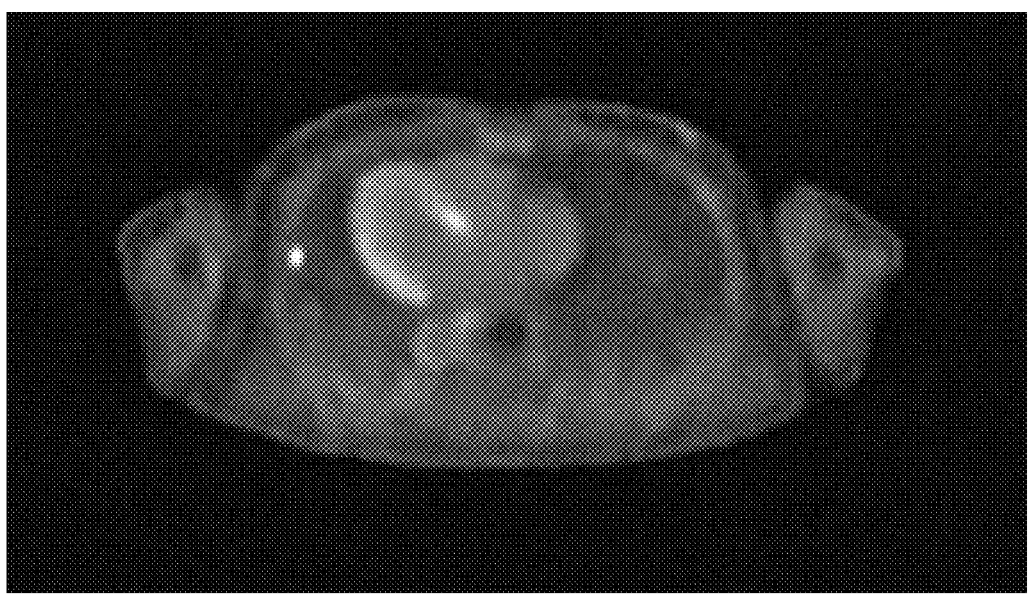
FIG. 3B shows a PET image using spatially-constant regularization with a large smoothing strength, according to one implementation.

FIGS. 3A and 3B show reconstructed PET images in which the regularization parameter $\beta$ is spatially constant. In FIG. 3A the regularization parameter $\beta$ (i.e., smoothing strength) is small. In FIG. 3B the regularization parameter $\beta$ (i.e., smoothing strength) is large. As shown by these figures, when reconstruction is performed using a spatially constant regularization parameter $\beta$, noise across different organs is not uniform. At the low levels of smoothing shown in FIG. 3A, the low activity regions such as lungs appear to be noisy, generating unphysical structure that might be confused for a lesion. As illustrated in FIG. 3B, when the smoothing level is increased to mitigate noise in the lung region, higher activity regions such as the heart become overly smooth and fine details are smeared out due to the poorer resolution. This tradeoff between resolution and noise is addressed through the use of a spatially varying map for the regularization parameter $\beta(\vec{r})$, thereby suppressing noise within low activity regions while preserving image features such as fine structures and sharp edges As would be understood by a person of ordinary skill in the art, the regularizer can be selected from a wide range of penalties. For example, the total variation minimization (TV) regularizer penalizes solutions for which the total variation is large. TV regularization is one non-limiting example of many different types of regularization penalties that can be used without departing from the spirit of the methods described herein. Other non-limiting examples of regularization penalties included, e.g., a Huber penalty, a broken parabola penalty, quadratic penalties, non-quadratic penalties, Further, one way to preserve sharp boundaries and features within a reconstructed image is to use an edge-preserving potential function, which can be expressed as $$\psi(t) = \delta\left(\frac{|t|}{\delta} - \log\left(1 + \frac{|t|}{\delta}\right)\right),$$

wherein $\delta(\vec{r})$ is a position-dependent penalty parameter that controls the shape of the potential function and the extent of edge-preservation. Accordingly, in certain implementations, the spatially-varying regularization parameters ($\beta$ and/or $\delta$) are chosen based on the current activity estimate formed from previous iterations.

As a non-limiting example, one might want to use less edge-preservation in low background activity regions such as lungs because the local contrast is likely to be already high and less edge-preservation might help those regions look like those that a clinician is habituated to seeing and interpreting. Further, a greater smoothing parameter might be desirable in those regions to prevent noise from appearing as lesions. On the other hand greater contrast might be beneficial in high activity regions in order to more precisely distinguish finer details, and, even without more smoothing, the higher signals in these regions can be sufficient to prevent noise from appearing as lesions.

Figure 2:
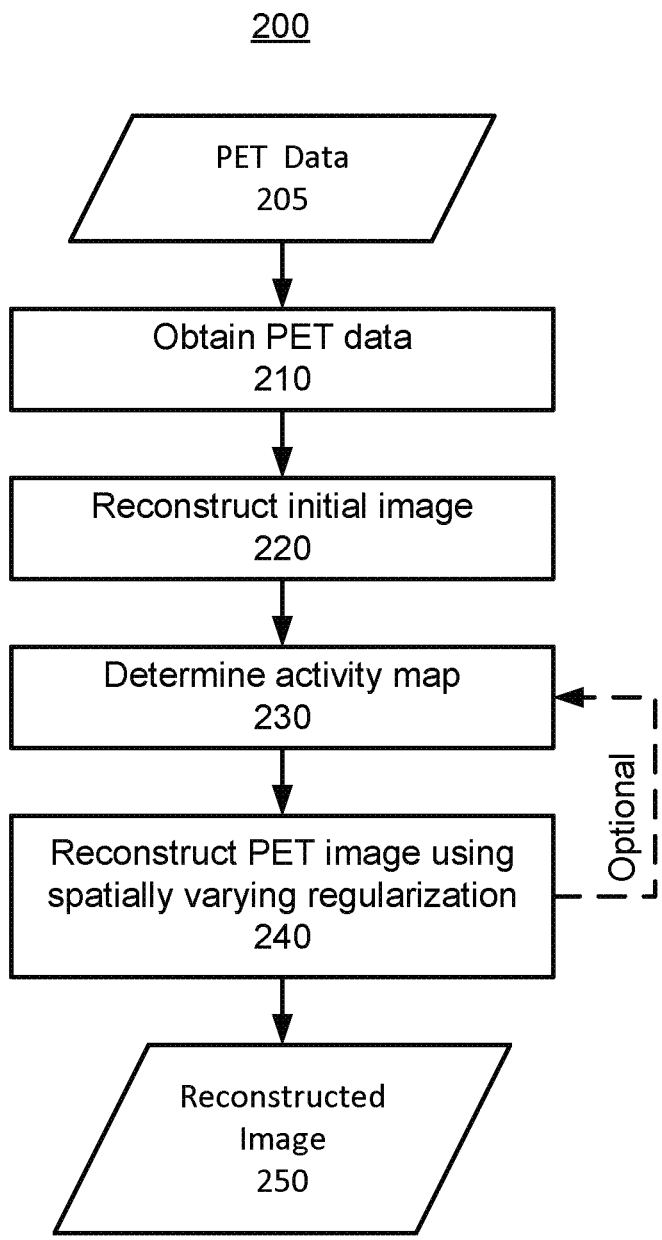
FIG. 2 shows a flow diagram of a method to perform iterative reconstruction of a PET image using spatially-varying regularization, according to one implementation.

FIG. 2 shows a non-limiting example of a flow chart for performing the methods described herein, according to certain implementations. In FIG. 2, method 200 begins at step 210 by obtaining emission data 205 for tomographic reconstruction of a PET image. For example, gamma rays incident on an array of scintillator crystals are converted to scintillation photons, which are in turn converted to photoelectrons by photodetectors. Further, in certain implementations, the photoelectron signals from the photodetectors can be amplified, pulse-shaped, filtered, and otherwise pre-conditioned and processed before being digitized using a data acquisition system (DAS) as time, energy, and position information for respective counts and/or coincidence pairs and then stored to a non-transitory computer readable memory. The PET data 205 can then be obtained from the memory in preparation for tomographic image reconstruction.

In certain implementations, the PET data 205 can be counts that are pre-processed, calibrated, and/or arranged into a sinogram format (e.g., a histogram of counts). In certain implementations, pre-processing can include position corrections, energy corrections, timing corrections, etc. Further, the emission data 205 can be corrected for sensitivity using various calibration and geometric factors. Moreover, the pre-processing can include corrections for a detector offset and gain, variations in quantum efficiency in the detectors, etc. Further, these corrections can be based on calibration data, empirical, and known parameters.

In step 220, an initial PET image is reconstructed. For example, the PET data 205 is used to reconstruct an image of radioactivity level (e.g., tracer density) as a function of voxel position. The image reconstruction can be performed using a back-projection method, a filtered back-projection method, a Fourier-transform-based image reconstruction method, an iterative image reconstruction method, a matrix-inversion image reconstruction method, a statistical image reconstruction method, a list-mode method, or other reconstruction method or combination thereof, as would be understood as a person of ordinary skill in the art. For example, the initial PET image can be reconstructed using a predefined number of iterations (e.g., 2-5 iterations) an OS-EM algorithm that is initialized with an FBP reconstructed PET image.

In step 220, the activity map is determined from the initial PET image, but the activity map is not necessarily identical with the initial PET image. In certain implementations, the fine resolution is not required for the spatial variation of the regularization. For example, the activity map can be based on a smoothed or coarse-grained version of the initial PET image in which a low-spatial-frequency filter has been applied to the initial PET image. Also, other denoising methods could be applied to mitigate the effect of noise on the activity map and the spatial variation of the regularization.

Exemplary denoising methods include linear smoothing filters, anisotropic diffusion, non-local means, or nonlinear filters. Linear smoothing filters remove noise by convolving the original image with a mask that represents a low-pass filter or smoothing operation. For example, the Gaussian mask comprises elements determined by a Gaussian function. This convolution brings the value of each pixel into closer agreement with the values of its neighbors. Anisotropic diffusion removes noise while preserving sharp edges by evolving an image under a smoothing partial differential equation similar to the heat equation. A median filter is an example of a nonlinear filter and, if properly designed, a nonlinear filter can also preserve edges and avoid blurring. The median filter is one example of a rank-conditioned rank-selection (RCRS) filter, which can be applied to remove salt and pepper noise from an image without introducing significant blurring artifacts. Additionally, a filter using a total-variation (TV) minimization regularization term can be applied if an imaged region supports an assumption of uniformity over large areas that are demarked by sharp boundaries between the uniform areas. A TV filter is another example of a nonlinear filter. Moreover, non-local means filtering is an exemplary method of determining denoised pixels using a weighted average over similar patches within the images.

In step 240, the PET image is refined and improved using an IR algorithm that includes spatially-varying regularization, resulting in the PET image from the final iteration of the IR algorithm being the reconstructed image 250. In certain implementations, an optional loop from step 240 to step 230 is included whereby the estimated activity map is periodically updated based on the PET image resulting from the latest iteration of the IR algorithm. Then the IR algorithm proceeds based on the updated activity map. Thus, the activity map improves together with the improving PET image.

In certain implementations, step 240 is performed using an OS-EM algorithm to reconstruct the PET image until stopping criteria are reached (e.g., a maximum number of iterations or a convergence criterion is satisfied) and the reconstructed image 250 is output.

In certain implementations, step 210 begins with the measured data y (i.e., the PET data 205), and performs a predetermined number of initial OS-EM iterations to estimate the activity map $x_{OSEM}$ (i.e., in this non-limiting example the activity map is the same as the PET image $x_{OSEM}$ of the current iteration of the OS-EM algorithm). The predetermined number of initial OS-EM iterations can be one, in certain implementations, and can be more than one in other implementations.

In certain implementations, the spatial variation in the regularization arises from the regularization $\beta(\vec{r})$ being position dependent. The position dependent regularization $\beta(\vec{r})$ can be referred to as a β-map, and can be represented as $\beta_j$ in which the subscript j is the index of the $j^{th}$ voxel/pixel in the reconstructed PET image $x_{OSEM}$. That is, the β-map is scaled according to $\beta_j = f(xj_{OSEM})$ for each pixel j, wherein $f(\cdot)$ can be any user-selected function. For example, the user-selected function $f(\cdot)$ can include smoothing, low-frequency filtering, and/or denoising, as discussed above.

Figure 4A:
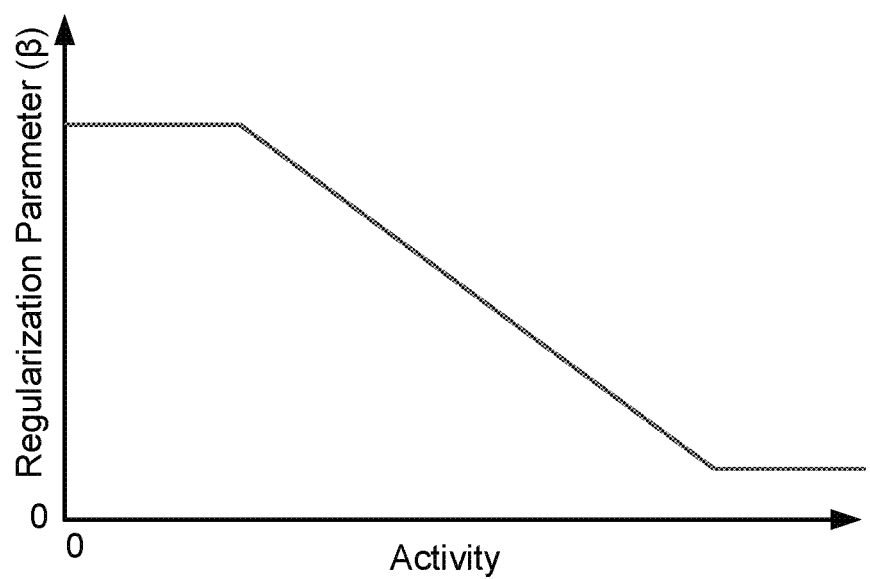
FIG. 4A shows plot of a first function relating activity level to a regularization parameter $\beta$, according to one implementation.
Figure 4B:
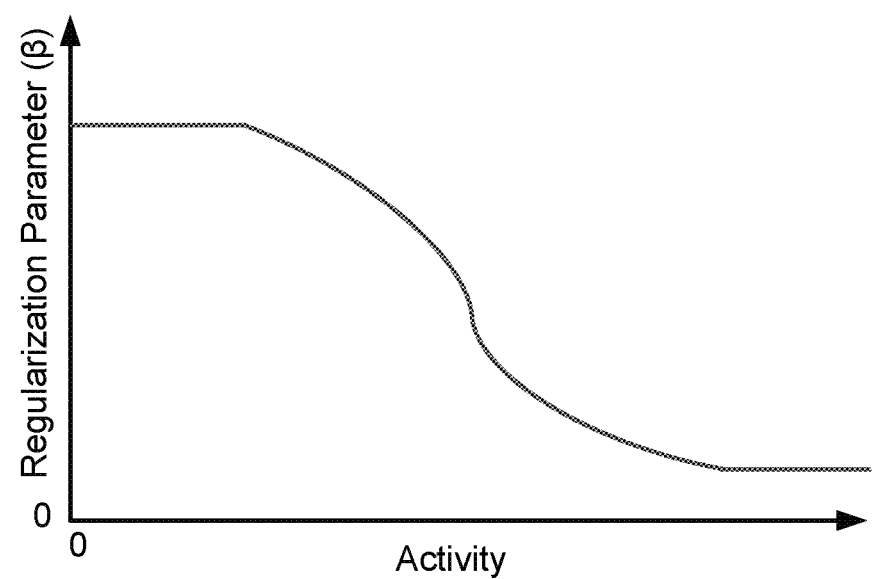
FIG. 4B shows plot of a second function relating the activity level to the regularization parameter $\beta$, according to one implementation.
Figure 6A:
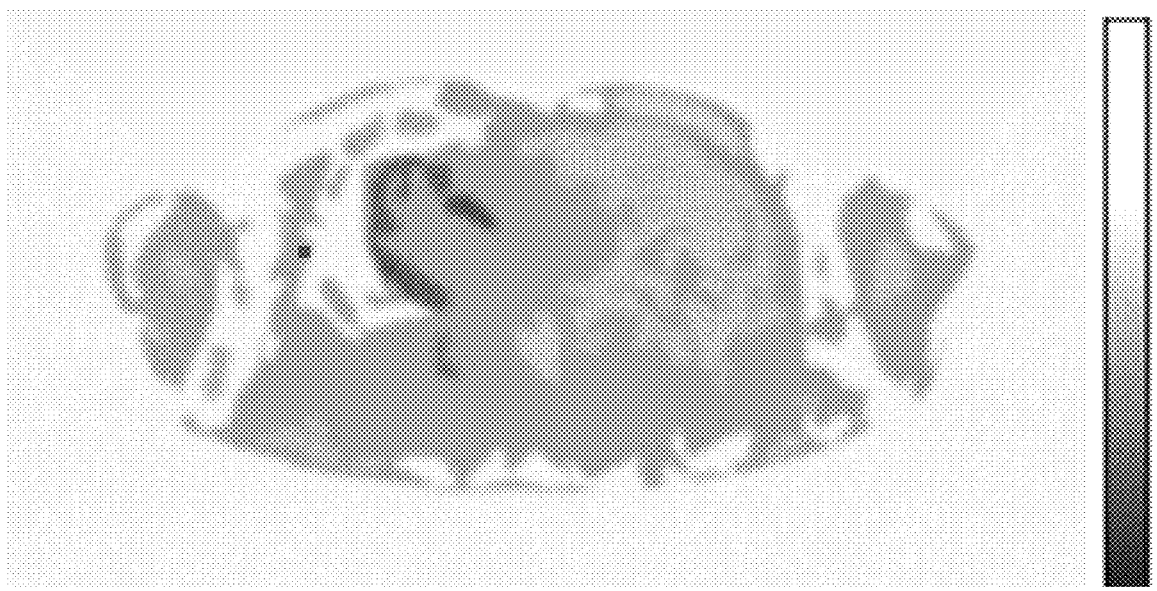
FIG. 6A shows a $\beta$-map for the PET image in FIG. 3B, according to one implementation.

FIGS. 4A and 4B illustrate non-limiting examples of user defined functions $f(\cdot)$ that would induce a high level of smoothing when the activity is low and a low level of smoothing when the activity is high. Further, FIG. 6A shows a non-limiting example of a β-map based on a combination of applying a low-frequency filter to the PET image shown in FIG. 3B and then applying a user-defined function, such as shown in FIG. 4A.

In certain implementations, the β-map can also include additional factors such as a scaling by the system sensitivity, in which case the final β-map can be given by $\beta_j = f(xj_{OSEM}) \times Sensitivity_j$, wherein $Sensitivity_j$ is a system sensitivity corresponding to the $j^{th}$ voxel/pixel in the reconstructed image $x_{OSEM}$.

Similarly, a δ-map can be generated according to a scaling rule for the position-dependent edge-enhancement parameter $\delta(\vec{r})$, such that $$\delta_j = g(xj_{OSEM}),$$

wherein $g(\cdot)$ can be another user-selected function.

Figure 5A:
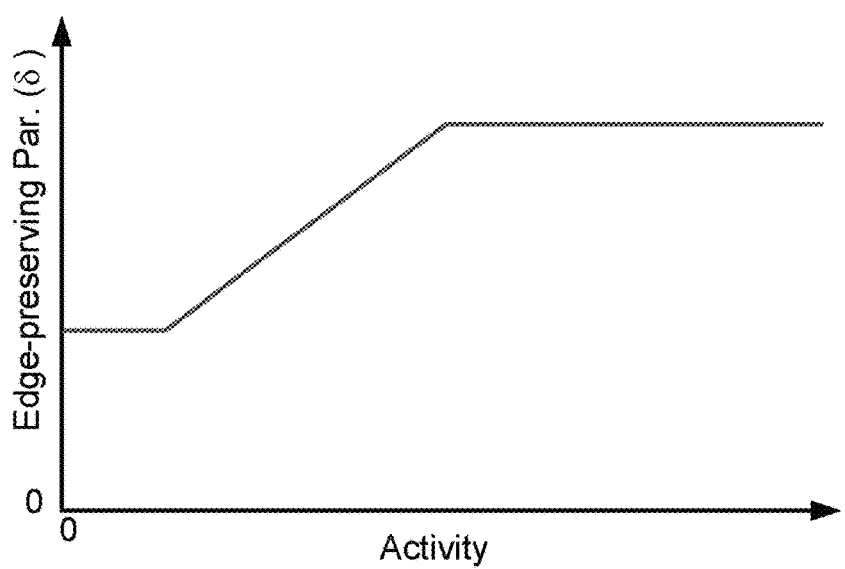
FIG. 5A shows plot of a first function relating the activity level to an edge-preserving parameter $\delta$, according to one implementation.
Figure 5B:
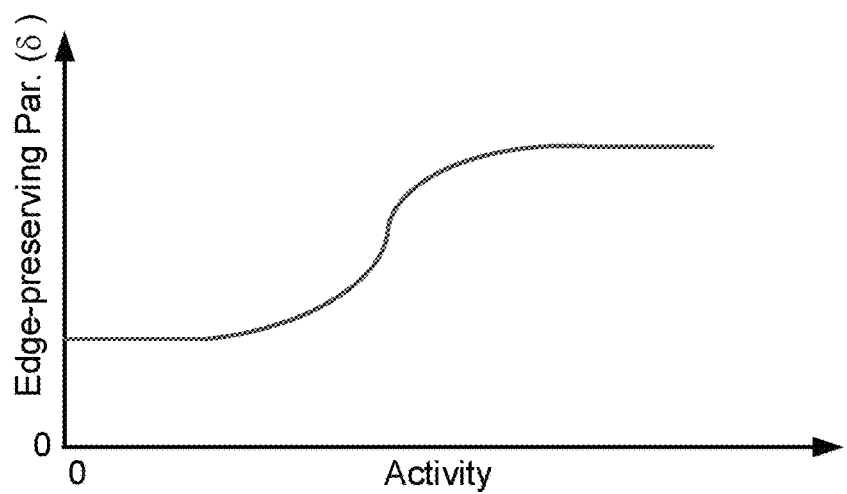
FIG. 5B shows plot of a second function relating the activity level to the edge-preserving parameter $\delta$, according to one implementation.
Figure 5C:
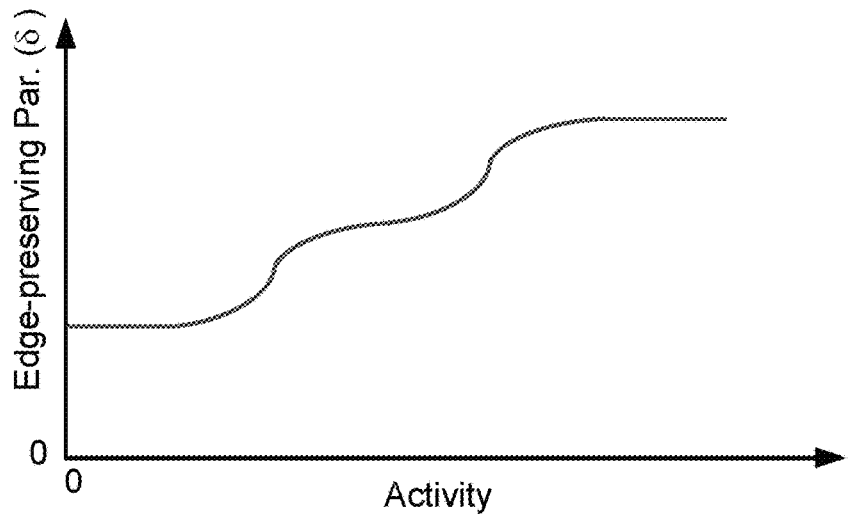
FIG. 5C shows plot of a third function relating the activity level to the edge-preserving parameter $\delta$, according to one implementation.
Figure 6B:
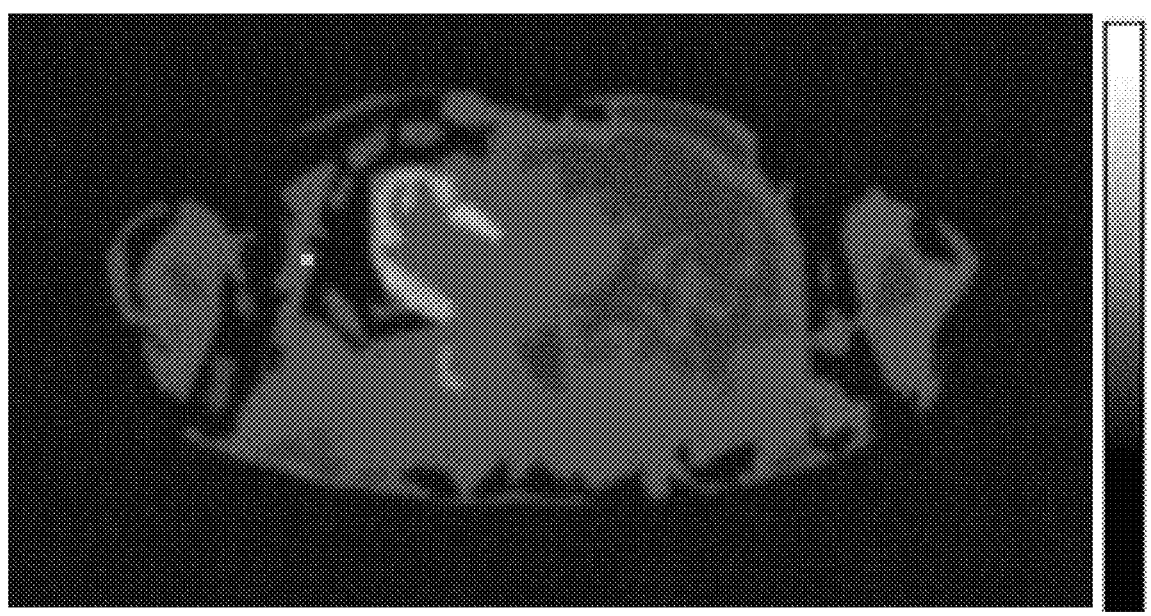
FIG. 6B shows a $\delta$-map for the PET image in FIG. 3B, according to one implementation.

FIGS. 5A, 5B, and 5C illustrate non-limiting examples of user defined functions $g(\cdot)$ that would induce more round/blurred features when the activity is low and sharper features/resolution when the activity is high. Further, FIG. 6B shows a non-limiting example of a δ-map based on a combination of applying a low-frequency filter to the PET image shown in FIG. 3B and then applying a user-defined function, such as shown in FIG. 5A.

In certain implementations, after one or more iterations of the IR algorithm reconstructing the PET image, the β- and δ-maps can be updated before proceeding to another round of one or more iterations of the IR algorithm. This alternating process can be continued for a predetermined number of iterations of the loop between steps 230 and 240 (e.g., 10 or 15 iterations) after which the β and δ maps are fixed and the IR algorithm continues to convergence.

Any globally convergent numerical optimization algorithm can be used to find the optimizer of the final objection function (with convex penalties).

Figure 7:
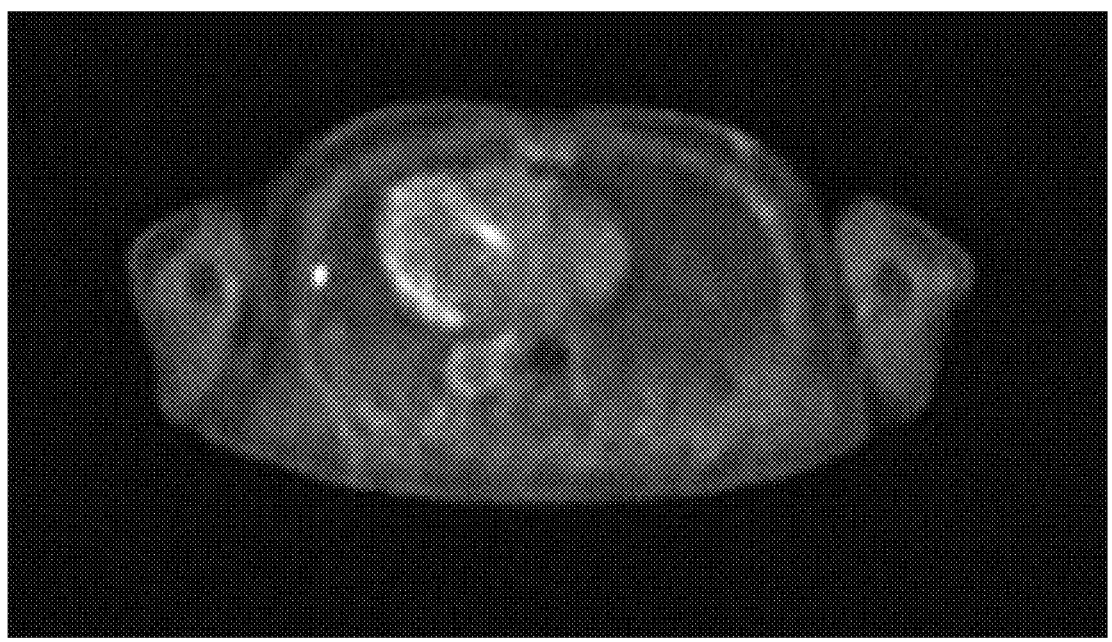
FIG. 7 shows a PET image that was reconstructed using spatially-varying regularization, according to one implementation.

FIG. 7 shows a PET image that has been reconstructed using a spatially-varying regularization based on the activity level. Compared to the constant low-smoothing PET image in FIG. 3A, the low activity regions in FIG. 7 (e.g., the lung region) have relatively low noise with smooth features. Further, compared to the constant high-smoothing PET image in FIG. 3B, the high activity regions in FIG. 7 (e.g., the heart region) show fine resolution with sharp contrast and details. Thus, the methods disclosed herein are able to achieve better image quality than related methods that use spatially constant regularization.

The optimization problem to be solved by the IR algorithm is now described according to certain implementations. The regularized reconstruction of a PET image can be found by solving the optimization problem $$\hat{x} = \arg\max_{x \geq 0} \sum_i L(y \mid x) - \beta \phi(x),$$

wherein $\phi(x)$ can be an image roughness penalty and β controls the strength of the regularization. The regularization term $\phi(x)$ can be determined as the intensity difference between neighboring pixels, which is given by $$\phi(x) = \sum_j \sum_{k \in \aleph_j} w_{jk} \psi_\delta(x_j - x_k),$$

wherein $\psi_\delta(t)$ is the penalty function, δ is a parameter that controls the smoothness of the penalty function, $w_{jk}$ is the weighting factor related to the distance between pixel j and pixel k in the neighborhood $N_j$. An example of $\psi_\delta(t)$ is the Huber function, which can be expressed as $$\psi_\delta(t) = \begin{cases} \frac{1}{2}t^2, & \delta \geq |t| \\ \delta|t| - \frac{\delta^2}{2}, & \text{otherwise} \end{cases}.$$

In addition to the Huber function, the regularization term $\phi(x)$ can be a quadratic regularization term, a total variation minimization term, or any other regularization term.

The Poisson likelihood function L(y|x) can be given by $$L(x) = -\sum_j s_j x_j + \sum_i \log([Px]_i + r_i)$$

wherein $s_j$ is the sensitivity of voxel j, P is the system matrix whose elements are denoted by $p_{ij}$ and represent the probability that the volume pixel of the reconstructed image corresponding to index j is within the line of response (LOR) associated with the $i^{th}$ detection event. Here $[\cdot]_i$ represents the $i^{th}$ element from a vector. The mean background signal is denoted by $r_i$, which includes counts due to random events and scatter events. In PET, the background signal is primarily made up of accidental coincidences (ACs), also known as randoms, and scatters.

For many annihilation events, only one photon of a pair of photons is detected because the other photon is absorbed or scattered out of plane of a PET detector ring. Further, some photons reaching the scintillating detectors of the PET detector ring are not detected due to a less than unity quantum efficiency of the detectors. Detection events in which only one of a pair of photons is detected can be referred to as "singles." If two singles from separate annihilations are detected within the coincidence timing window, then they are mistakenly registered as having arisen from the same annihilation. This is called an accidental coincidence (AC) event, also known as a random event. Stated differently, an AC event occurs when two unrelated singles are detected within a coincidence timing window.

Although most scattered photons in the body leave the detector plane undetected, some scattered photons are still detected and registered resulting in an incorrect LOR. In certain implementations, some of these scattered events resulting in incorrect LORs can be removed by energy discrimination because photons lose a fraction of their energy during the Compton interaction giving rise to the scatter event. Even so, some scattered photons (scatters) and some random coincidences (randoms) will inevitable be recorded, and, thus, the background signal r includes the randoms and the scatters.

In certain implementations, the above optimization problem can be solved by the separable paraboloidal surrogate (SPS) approach with acceleration by ordered subsets (OS), for example. In general any optimization method can be used to optimize the objective function, including, e.g., a gradient-descent method or other known methods. Further examples of optimization methods that can be used to solve the above optimization problem include: an augmented-Lagrangian method, an alternating direction-method-of-multiplier method, a Nesterov method, a preconditioned-gradient-descent method, an ordered subset method, or a combination of the foregoing.

In certain implementations, the methods described herein can be performed using a separable quadratic surrogate (SQS) function. Further, the methods described herein can be accelerated using a combination of OS and the Nesterov accelerated gradient methods. A Nesterov accelerated gradient implementation can be used to more rapidly converge to the reconstructed image minimizing the Poisson likelihood objective function. In certain implementations, an OS method can be used together with the SQS method described above and with the Nesterov acceleration described above.

Figure 8A:
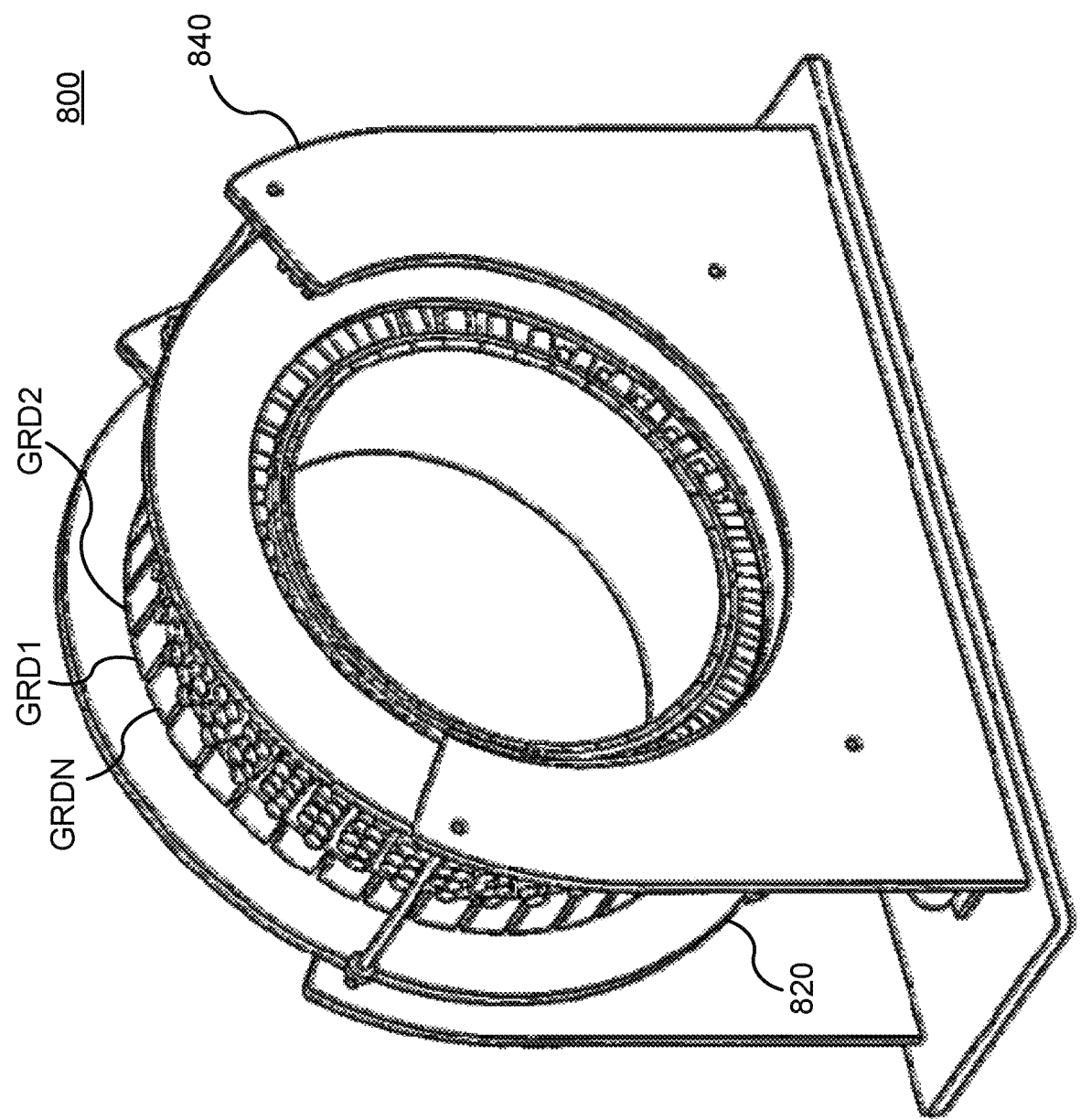
FIG. 8A shows a perspective view of a positron-emission tomography (PET) scanner, according to one implementation.
Figure 8B:
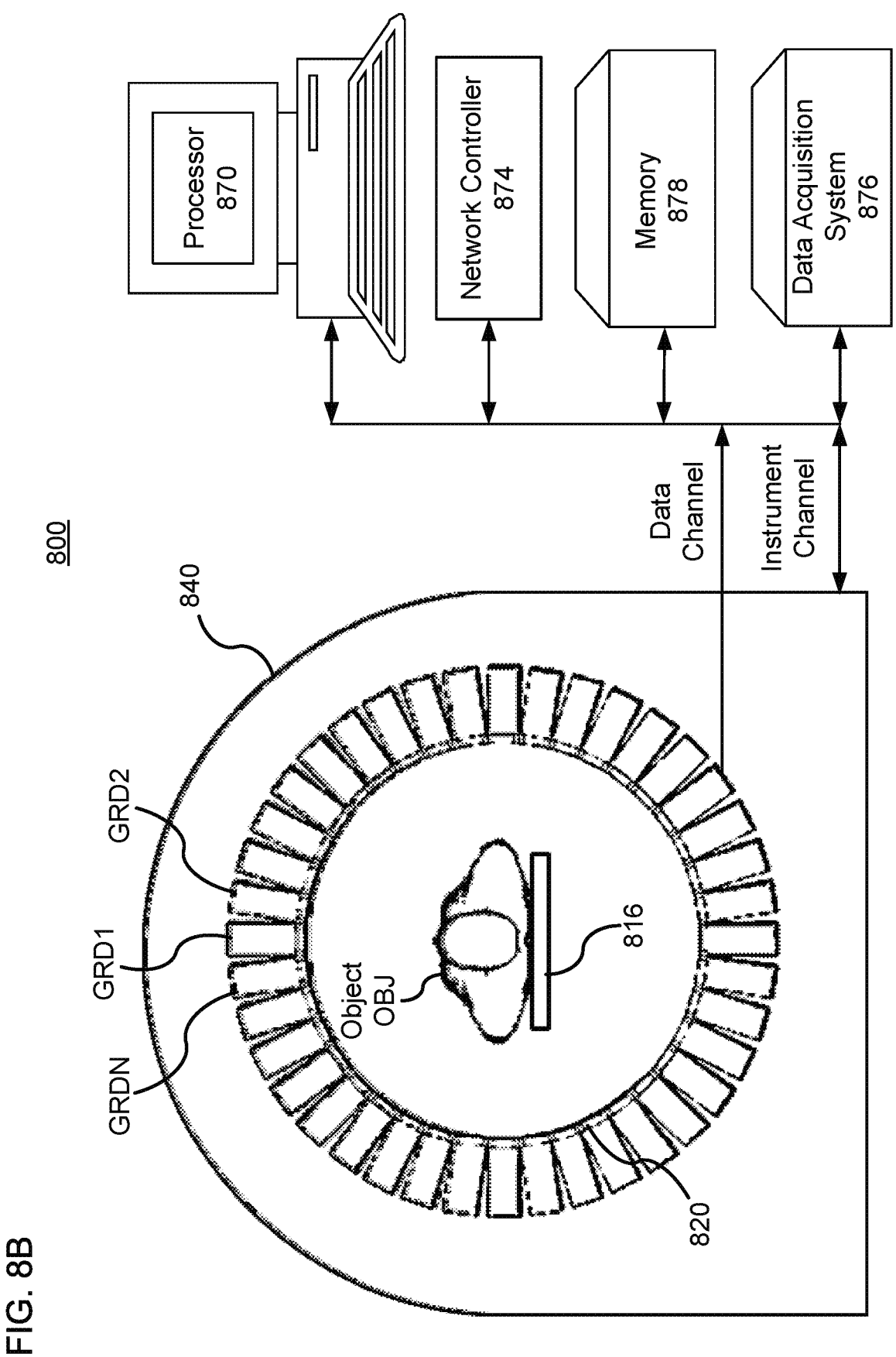
FIG. 8B shows a schematic view of the PET scanner, according to one implementation.

FIGS. 8A and 8B show a non-limiting example of a PET scanner 800 that can implement the methods 100 and 200. The PET scanner 800 includes a number of gamma-ray detectors (GRDs) (e.g., GRD1, GRD2, through GRDN) that are each configured as rectangular detector modules. According to one implementation, the detector ring includes 40 GRDs. In another implementation, there are 48 GRDs, and the higher number of GRDs is used to create a larger bore size for the PET scanner 800.

Each GRD can include a two-dimensional array of individual detector crystals, which absorb gamma radiation and emit scintillation photons. The scintillation photons can be detected by a two-dimensional array of photomultiplier tubes (PMTs) that are also arranged in the GRD. A light guide can be disposed between the array of detector crystals and the PMTs.

Alternatively, the scintillation photons can be detected by an array a silicon photomultipliers (SiPMs), and each individual detector crystals can have a respective SiPM.

Each photodetector (e.g., PMT or SiPM) can produce an analog signal that indicates when scintillation events occur, and an energy of the gamma ray producing the detection event. Moreover, the photons emitted from one detector crystal can be detected by more than one photodetector, and, based on the analog signal produced at each photodetector, the detector crystal corresponding to the detection event can be determined using Anger logic and crystal decoding, for example.

FIG. 8B shows a schematic view of a PET scanner system having gamma-ray (gamma-ray) photon counting detectors (GRDs) arranged to detect gamma-rays emitted from an object OBJ. The GRDs can measure the timing, position, and energy corresponding to each gamma-ray detection. In one implementation, the gamma-ray detectors are arranged in a ring, as shown in FIGS. 8A and 8B. The detector crystals can be scintillator crystals, which have individual scintillator elements arranged in a two-dimensional array and the scintillator elements can be any known scintillating material. The PMTs can be arranged such that light from each scintillator element is detected by multiple PMTs to enable Anger arithmetic and crystal decoding of scintillation event.

FIG. 8B shows an example of the arrangement of the PET scanner 800, in which the object OBJ to be imaged rests on a table 816 and the GRD modules GRD1 through GRDN are arranged circumferentially around the object OBJ and the table 816. The GRDs can be fixedly connected to a circular component 820 that is fixedly connected to the gantry 840. The gantry 840 houses many parts of the PET imager. The gantry 840 of the PET imager also includes an open aperture through which the object OBJ and the table 816 can pass, and gamma-rays emitted in opposite directions from the object OBJ due to an annihilation event can be detected by the GRDs and timing and energy information can be used to determine coincidences for gamma-ray pairs.

In FIG. 8B, circuitry and hardware is also shown for acquiring, storing, processing, and distributing gamma-ray detection data. The circuitry and hardware include: a processor 870, a network controller 874, a memory 878, and a data acquisition system (DAS) 876. The PET imager also includes a data channel that routes detection measurement results from the GRDs to the DAS 876, a processor 870, a memory 878, and a network controller 874. The data acquisition system 876 can control the acquisition, digitization, and routing of the detection data from the detectors. In one implementation, the DAS 876 controls the movement of the bed 816. The processor 870 performs functions including reconstructing images from the detection data, pre-reconstruction processing of the detection data, and post-reconstruction processing of the image data, as discussed herein.

The processor 870 can be configured to perform various steps of methods 100 and/or 200 described herein and variations thereof. The processor 870 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the CPU in the processor 870 can execute a computer program including a set of computer-readable instructions that perform various steps of method 100 and/or method 200, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, the CPU can be implemented as multiple processors cooperatively working in parallel to perform the instructions.

The memory 878 can be a hard disk drive, CD-ROM drive, DVD drive, FLASH drive, RAM, ROM or any other electronic storage known in the art.

The network controller 874, such as an Intel Ethernet PRO network interface card from Intel Corporation of America, can interface between the various parts of the PET imager. Additionally, the network controller 874 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G and 4G wireless cellular systems. The wireless network can also be WiFi, Bluetooth, or any other wireless form of communication that is known.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. An apparatus, comprising:
   circuitry configured to
      obtain emission data representing detection events of gamma rays at a plurality of detector elements,
      reconstruct, using the obtained emission data, a first image of a radioactivity level and generate an activity weighting map based on the radioactivity level, and
      reconstruct, using the obtained emission data and the activity weighting map, a second image of the radioactivity level, the reconstruction of the second image being performed using an iterative-reconstruction method in which an objective function is optimized, the objective function including a regularization term that uses the activity weighting map and the objective function including a data fidelity term, wherein
      the objective function is defined by a difference between the data fidelity term and a product of the regularization term and a regularization parameter, and
      the regularization parameter is set in accordance with a radioactivity level of each location in the activity weighting map, and provides a relative weight between the data fidelity term and the regularization term, and has a property of increasing a degree of smoothing with respect to the second image along with an increase of the value of the regularization parameter, and a property of reducing both a noise level and a resolution.

2. The apparatus according to claim 1, wherein the circuitry is further configured to reconstruct the second image using the objective function including the regularization term, wherein the regularization term includes one or more spatial-varying edge-preserving parameters determined from the activity weighting map.

3. The apparatus according to claim 1, wherein the circuitry is further configured to reconstruct the second image using the objective function including the regularization term, wherein the regularization term includes one or more spatial-varying smoothing parameters determined from the activity weighting map.

4. The apparatus according to claim 2, wherein the circuitry is further configured to reconstruct the second image using the objective function including the regularization term, wherein the regularization term includes one or more spatial-varying smoothing parameters determined from the activity weighting map.

5. The apparatus according to claim 1, wherein the circuitry is further configured to reconstruct the first image using an iterative-reconstruction method that is a same iterative-reconstruction method used to reconstruct the second image, except during reconstruction of the first image a predetermined parameter is used in the regularization term instead of the activity weighting map, which is used during reconstruction of the second image.

6. The apparatus according to claim 5, wherein the circuitry is further configured to reconstruct the first image by performing a predetermined number of iterations of the iterative-reconstruction method.

7. The apparatus according to claim 5, wherein the circuitry is further configured to
   update the activity weighting map based on the second image, and
   repeat reconstructing the second image of the radioactivity level using the updated activity weighting map.

8. The apparatus according to claim 1, wherein
   in the reconstruction of the second image, the iterative-reconstruction method is an ordered-subset expectation maximization (OSEM) method, which is iteratively repeated until a predetermined stopping criteria is reached, and
   the reconstruction of the first image is performed using the OSEM method until another predetermined stopping criteria is reached, the another predetermined stopping criteria including one or more of a predetermined maximum number of iterations and a convergence criterion.

9. The apparatus according to claim 1, wherein the circuitry is further configured to reconstruct the second image using the regularization term that includes a regularization parameter determined from the activity weighting map, the regularization parameter being a multiplicative factor that scales the regularization term.

10. The apparatus according to claim 9, wherein the circuitry is further configured to reconstruct the second image using the regularization parameter, wherein the regularization parameter is calculated using a sensitivity parameter that depends on a geometry of the detector elements with respect to voxels of the second image.

11. The apparatus according to claim 1, wherein the circuitry is further configured to reconstruct the second image using the objective function that includes the regularization term, wherein the regularization term includes an edge-preserving potential function that has a shape based on the activity weighting map.

12. The apparatus according to claim 1, wherein the circuitry is further configured to
   segment the activity weighting map according to types of organs represented therein, and
   reconstruct the second image, wherein the regularization term depends on the segmentation of the activity weighting map.

13. The apparatus according to claim 1, wherein the circuitry is further configured to reconstruct the second image, wherein a spatially varying type of the regularization term depends on the activity weighting map.

14. A method, comprising:
obtaining emission data representing detection events of gamma rays at a plurality of detector elements,
reconstructing, using the obtained emission data, a first image of a radioactivity level and an activity weighting map based on the radioactivity level, and
reconstructing, using the obtained emission data and the activity weighting map, a second image of the radioactivity level, the reconstruction of the second image being performed using an iterative-reconstruction method in which an objective function is optimized, the objective function including a regularization term that uses the activity weighting map and the objective function including a data fidelity term, wherein
the objective function is defined by a difference between the data fidelity term and a product of the regularization term and a regularization parameter, and
the regularization parameter is set in accordance with a radioactivity level of each location in the activity weighting map, and provides a relative weight between the data fidelity term and the regularization term, and has a property of increasing a degree of smoothing with respect to the second image along with an increase of the value of the regularization parameter, and a property of reducing both a noise level and a resolution.

15. The method according to claim 14, wherein the reconstructing of the second image further includes that the regularization term includes one or more of (i) a spatial-varying smoothing parameter determined from the activity weighting map and (ii) a spatial-varying edge-preserving parameter determined from.

16. The method according to claim 14, further includes updating the activity weighting map based on the second image, and
repeating the reconstructing of the second image based on the updated activity weighting map.

17. The method according to claim 14, wherein
in the reconstructing of the second image, the iterative-reconstruction method is an ordered-subset expectation maximization (OSEM) method, which is iteratively repeated until a predetermined stopping criteria is reached, and
the reconstructing of the first image is performed using the OSEM method until another predetermined stopping criteria is reached, the another predetermined stopping criteria including one or more of a predetermined maximum number of iterations and a convergence criterion.

18. The apparatus according to claim 1, wherein
the reconstructing of the second image is performed using a regularization parameter in the regularization term,
the regularization parameter is calculated using one or more of the activity weighting map and a sensitivity parameter,
the regularization parameter is a multiplicative factor that scales the regularization term, and,
when the regularization parameter is calculated using the sensitivity parameter, the sensitivity parameter depends on a geometry of the detector elements with respect to voxels of the second image.

19. The method according to claim 14, wherein the reconstructing of the first image is performed by
initializing the first image using a filtered back-projection methods, and
performing a predetermined number of iterations of an iterative reconstruction method starting with the initialized first image to generate the first image.

20. A non-transitory computer-readable storage medium including executable instructions, which when executed by circuitry, cause the circuitry to perform the method according to claim 14.

* * * * *